United States Patent Office 3,336,365
Patented Aug. 15, 1967

3,336,365
2-PROPYNYL BIS ESTERS
Dale Robert Dill, Webster Groves, Mo., assignor to Monsanto Company, St. Louis, Mo., a corporation of Delaware
No Drawing. Filed Oct. 19, 1964, Ser. No. 404,926
7 Claims. (Cl. 260—475)

This invention relates to a new class of chemical compounds. More particularly, this invention relates to novel 2-propynyl bis esters.

The novel 2-propynyl bis esters have the general formula,

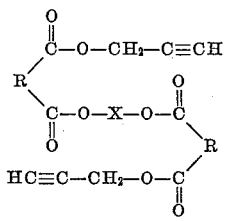

wherein X is a divalent radical selected from the group consisting of (a) an alkylene radical of from 1 to 20 carbon atoms;
(b) xylylene;
(c) 2-butenylene; and R is a member of the group consisting of phenylene, alkyl-substituted phenylene of 7 to 16 carbon atoms, halophenylene, nitrophenylene, cyclohexenylene, naphthylene, ethylene, trimethylene, alkyl-substituted ethylene of 3 to 12 carbon atoms, alkenyl-substituted ethylene of 7 to 14 carbon atoms, vinylene, chlorovinylene, bromovinylene, 1-isopropenylene and 3-isopropylene.

It has been found that the heretofore described 2-propynyl bis esters can be readily prepared by heating, at a temperature of from about 50° C. to about 200° C., a polycarboxylic acid anhydride, 2-propyn-1-ol, a tertiary amine and an organic dihalide in molar quantities of the ratio of about 2:2:2:1.

The polycarboxylic acid anhydrides useful in the preparation of the novel compounds of this invention include succinic anhydride, substituted succinic anhydrides such as propylsuccinic anhydride, methylbutylsuccinic anhydride, hexylsuccinic anhydride, heptylsuccinic anhydride, pentenylsuccinic anhydride, octenylsuccinic anhydride, noneylsuccinic anhydride, α,β-diethylsuccinic anhydride, tetrapropenylsuccinic anhydride and the like; glutaric anhydride; maleic anhydride; substituted maleic anhydrides such as chloromaleic anhydride; dichloromaleic anhydride and the like; itaconic anhydride; citraconic anhydride; aconitic anhydride; tetrahydrophthalic anhydride; phthalic anhydride; methyltetrahydrophthalic anhydride; hexachloroendomethylenetetrahydrophthalic anhydride; substituted phthalic anhydrides such as tetrachlorophthalic anhydride, tetrabromophthalic anhydride, tetraiodophthalic anhydride, 4-nitrophthalic anhydride, methylphthalic anhydride, ethylphthalic anhydride, propylphthalic anhydride, butylphthalic anhydride and the like; and naphthalic anhydrides such as 1,2-naphthalic anhydride, 1,8-naphthalic anhydride, 2,3-naphthalic anhydride and the like. Also, other dicarboxylic acid anhydrides, useful in the preparation of polymerizable compositions, include the Diels-Alder adducts of maleic acid and aliphatic compounds having conjugated double bonds.

Tertiary amines suitable for use in preparing the compounds of this invention can be represented by the formula,

wherein $R_1$, $R_2$ and $R_3$ are like or unlike saturated aliphatic radicals. Preferably, $R_1$, $R_2$ and $R_3$ have a total of 3 to 24 carbon atoms, and it is also preferred that $R_1$, $R_2$ and $R_3$ be alkyl radicals. Non-limiting examples of such tertiary amines are trimethylamine, triethylamine, tri-n-propylamine, triisopropylamine, tri-n-butylamine, triisoamylamine, trihexylamine, triethanolamine, methyldiethylamine, dimethylethylamine, methyldiethanolamine, dimethylethanolamine, dimethylcyclohexylamine, dimethylhexylamine, dimethyldecylamine and the like.

The organic dihalide reactants of this invention include dihaloalkanes, aliphatic dihalo ethers, dihaloxylenes and dihaloalkenes.

The dihaloalkane reactant of this invention can be represented by $R_4Z_2$, where $R_4$ is a straight or branched chain alkylene radical containing up to 20 carbon atoms, and Z is a halogen atom such as chlorine, bromine or iodine.

Illustrative of the dihaloalkane reactants of this invention are dichloromethane,
dibromomethane,
diiodomethane,
1,2-dichloroethane,
1,2-dibromoethane,
1,3-dibromopropane,
1,3-diiodopropane,
1-chloro-3-bromopropane,
1-iodo-3-chloropropane,
1,3-dichlorobutane,
2,3-dichlorobutane,
1,4-dichlorobutane,
1,4-diiodobutane,
1-bromo-4-chlorobutane,
1-iodo-3-chlorobutane,
1-iodo-4-chlorobutane,
1,3-dichloropentane,
1,4-dichloropentane,
1,5-dichloropentane,
1,5-dibromopentane,
2,3-dibromopentane,
1-bromo-5-chloropentane,
1-iodo-3-chloropentane,
1,1-dichloro-3-methylbutane,
1,3-dibromo-2,2-dimethylbutane,
1,6-dichlorohexane,
1,2-dichlorohexane,
1,5-dichlorohexane,
1,2-dibromohexane,
1,4-dibromohexane,
1,4-diiodohexane,
1,6-dibromohexane,
1,6-diiodohexane,
2,3-dibromohexane,
2,5-dibromohexane,
3,4-dichlorohexane,
3,4-dibromohexane,
1,3-dibromo-2-methylpentane,
1,2-dibromo-3-methylpentane,
1,5-dibromo-3-methylpentane,
1,2-dibromo-4-methylpentane,
1,2-dichloro-3,3-dimethylbutane,
1,1-dichloroheptane,
1,4-dibromoheptane,
1,7-dibromoheptane,
1,7-dichloroheptane,
1,5-dichloro-3,3-dimethylpentane,
3-methyl-2,4-dibromohexane,
1,2-dichloro-3,4-dimethylpentane,
1,3-bromo-2-ethylpropane,
1,8-dichlorooctane,
1,4-dibromooctane, 1,8-dibromooctane,
1,6-dichlorooctane,
1,7-dichlorooctane,
3-isopropyl-1,5-dibromopentane,
1,9-dichlorononane,
1,9-dibromononane,
1,2-dichlorononane,
1-chloro-9-iodononane,
1,10-dichlorodecane,
1,10-dibromodecane,
1,12-dichlorododecane,
1,12-dibromododecane,
1,14-dibromotetradecane,
1,18-dibromooctadecane,
1,18-dichlorooctadecane and 1,20-dibromoeicosane.

Typical utilizable aliphatic dihalo ethers include

α,α'-dichlorodiethyl ether,
β,β'-diiododiethyl ether,
1,3-dichloropropyl ethyl ether,
α,β-dibromoethyl-n-propyl ether,
α,β-dibromoethyl-n-propyl ether,
α,β-dibromopropyl ethyl ether,
α,β-dibromoethyl-n-butyl ether,
α,β-dibromo-n-butyl ethyl ether,
α,β-dibromoisobutyl ethyl ether,
4,4'-dichlorodibutyl ether,
4,4'-dichlorodibutyl ether and
4,4'-dichlorodiamyl ether.

Dihaloxylenes which can be used in preparing the compounds of this invention include α,α'-dibromoxylene.

The dihaloalkenes which are useful in preparing the compounds of this invention include 1,4-dichlorobutene-2 and 1,4-dibromobutene-2.

The invention will be more readily understood by reference to the following examples which describe the detailed preparation of representative compounds. There are, of course, many forms of this invention which will become obvious to one skilled in the art once the invention has been fully disclosed, and it will accordingly be recognized that these examples are given for the purpose of illustration only, and are not to be construed as limiting the scope of this invention in any way.

Example 1

To a suitable reaction vessel having means for the addition and removal of heat, means for measuring the temperature of the reaction mass, means for agitating the reaction mass, means for the addition and removal of solids and liquids, and fitted with a condenser, there are charged 222.0 grams (1.5 mols) of phthalic anhydride and 89.0 grams (1.59 mols) of 2-propyn-1-ol. The mixture is heated to about 110° C., and 162.0 grams (1.6 mols) of triethylamine is added. There is then added 141.0 grams (0.75 mol) of 1,3-dibromobutane. The resultant reaction mixture is held at a temperature of about 135° C. for about two hours and then washed with several water and lye washes. The oil layer from the washing step is steam sparged and dehydrated at 120° C. at 50 mm. Hg for about one hour. There is obtained 238.3 grams (79% of theory) of 1,3-butanediol bis 2-propynyl phthalate.

Example 2

Following the procedure of Example 1, 168 grams (1.5 mols) of itaconic anhydride, 90 grams (1.6 mols) of 2-propyn-1-ol, 162 grams (1.6 mols) of triethylamine and 64 grams (0.75 mol) of dichloromethane are utilized to prepare methylene bis(2-propynyl) itaconate in high yield.

Example 3

Following the procedure of Example 1, 222 grams (1.5 mols) of phthalic anhydride, 90 grams (1.6 mols) of 2-propyn-1-ol, 162 grams (1.6 mols) of triethylamine and 225 grams (0.75 mol) of 1,10-dibromodecane are utilized to prepare 1,10 decamethylene bis(2-propynyl phthalate) in good yield.

Example 4

Following the procedure of Example 1, 197 grams (1.5 mols) of chloromaleic anhydride, 90 grams (1.6 mols) of 2-propyn-1-ol, 162 grams (1.6 mols) of triethylamine and 95 grams (0.75 mol) of 1,1-dichlorobutane are utilized to prepare 1,1-butanediol bis(2-propynyl chloromaleate) in excellent yield.

Example 5

A suitable reaction vessel is charged with 150.2 grams (1.5 mols) of succinic anhydride, 89 grams (1.59 mols) of 2-propyn-1-ol, 162.0 grams (1.6 mols) of triethylamine and 141.0 grams (0.75 mol) of dibromobutane. The mixture is heated to about 140° C. and held at this temperature for about one hour. The reaction mixture is washed several times with water and aqueous sodium carbonate washes. The oil layer from the washing step is steam sparged and dehydrated under vacuum. There is obtained 146.1 grams (61% of theory) of 1,3 butanediol bis(2-propynyl succinate).

Examples 6–8

Following the procedure of Example 1, 1.5 mols of each of the anhydrides tabulated is substituted for the phthalic anhydride. The product obtained in each instance is as indicated.

6. Anhydride=tetrapropenyl succinic anhydride
   Product=1,3-butanediol bis(2-propynyl tetrapropenyl succinate).
7. Anhydride=chlorophthalic anhydride
   Product=1,3-butanediol bis(2-propynyl chlorophthalate).
8. Anhydride=1,8-naphthalic anhydride
   Product=1,3-butanediol bis(2-propynyl 1,8-naphthalate).

Example 9

Following the procedure of Example 1, 222 grams (1.5 mols) of phthalic anhydride, 90 grams (1.6 mols) of 2-propynyl-1-ol, 162 grams (1.6 mols) of triethylamine and 131.5 grams (0.75 mol) of α,α'-dichloroxylene are utilized to prepare α,α'-xylylene bis(2-propynyl phthalate) in good yield.

Examples 10–13

Following the procedure of Example 1, 1.5 mols of polycarboxylic acid anhydride and 0.75 mol of dihaloalkane are substituted, as tabulated below, for the like constituents of said example. The product obtained in each instance is as indicated.

10. Anhydride=citraconic anhydride
    Dihaloalkane=1,4-dichlorobutane
    Product=1,4-tetramethylene bis(2-propynyl citraconate).
11. Anhydride=4-nitrophthalic anhydride
    Dihaloalkane=1,5-diiodopentane
    Product=1,5-pentamethylene bis(2-propynyl-4-nitrophthalate).
12. Anhydride=methylphthalic anhydride
    Dihaloalkane=1,2-dichloroethane
    Product=1,2-ethylene bis(2-propynyl methylphthalate).
13. Anhydride=tetrahydrophthalic anhydride
    Dihaloalkane=1,4-dibromobutane
    Product=1,4-tetramethylene bis(2-propynyl tetrahydrophthalate).

Example 14

A suitable reaction vessel is charged with 171 grams (1.5 mols) of glutaric anhydride and 90 grams (1.6 mols) of 2-propyn-1-ol. The mixture is heated to about 105° C., and 162 grams (1.6 mols) of triethylamine is added. There is then added 95.4 grams (0.75 mol) of 1,4-dichlorobutane. The reaction mixture is held at a temperature of about 130° C. for about seven hours and then washed several times with water and aqueous sodium carbonate washes. The reaction mixture is then steam sparged and dehydrated under vacuum. A good yield of 1,4-tetramethylene bis (2-propynyl glutarate) is obtained.

*Example 15*

In the manner of Example 1, 147 grams (1.5 mols) of maleic anhydride, 90 grams (1.6 mols) of 2-propyn-1-ol, 162 grams (1.6 mols) of triethylamine and 162 grams (0.75 mol) of 1,4-dibromobutane are utilized to prepare 1,4-tetramethylene bis(2-propynyl maleate) in excellent yield.

*Example 16*

A suitable reaction vessel is charged with 150 grams (1.5 mols) of succinic anhydride and 90 grams (1.6 mols) of 2-propyn-1-ol. The mixture is heated to about 105° C., and 162 grams (1.6 mols) of triethylamine is added. There is then added 95 grams (0.75 mol) of 1,4-dichlorobutane. The reaction mixture is held at a temperature of about 125° C. for about six hours and then washed several times with water and lye washes. The reaction mixture is then steam sparged and dehydrated under vacuum. There is obtained 1,4-tetramethylene bis (2-propynyl succinate).

*Example 17*

A reaction vessel is charged with 98.1 grams (1.0 mol) of maleic anhydride, 61.7 grams (1.1 mols) of 2-propyn-1-ol and 2 ml. of thionyl chloride. After the mixture is allowed to react for about one hour, 111 grams (1.1 mols) of triethylamine and 100 grams (0.45 mol) of 1,4-dibromobutane are added. The reaction mixture is worked up in the manner described above, and there is obtained 1,4-butanediol bis(2-propynyl fumarate) in good yield.

*Example 18*

Following the procedure of Example 1, 148.1 grams (1.0 mol) of phthalic anhydride, 61.7 grams (1.1 mols) of 2-propyn-1-ol, 111 grams (1.1 mols) of triethylamine and 56.3 grams (0.45 mol) of 1,4-dichlorobutene-2 are utilized to prepare 2-butene-1,4-bis(propynyl phthalate) in good yield.

*Example 19*

Following the procedure of Example 1, 148.1 grams (1.0 mol) of phthalic anhydride, 62 grams (1.1 mols) of 2-propyn-1-ol, 111 grams (1.1 mols) of triethylamine and 106.0 grams (0.45 mol) of 1-bromo-7-chloroheptane are utilized to prepare 1,7-heptamethylene bis(2-propynyl phthalate) in high yield.

*Example 20*

Following the procedure of Example 1, 148.1 grams 1.0 mol) of phthalic anhydride, 62 grams (1.1 mols) of 2-propyn-1-ol, 111 grams (1.1 mols) of triethylamine and 118.0 grams (0.45 mol) of 1,8-dibromooctane are utilized to prepare 1,8-octamethylene bis(2-propynyl phthalate) in good yield.

The 2-propynyl esters are valuable as plasticizers for various resins, such as polyvinyl chloride, polyvinyl acetate and cellulose derivatives. These esters are also useful as a comonomer with other polymerizable materials, such as vinyl esters, acrylic or methacrylic esters, styrene, vinyl chloride and the like.

While this invention has been described with respect to certain embodiments, it is not so limited, and it is to be understood that variations and modifications thereof may be made without departing from the spirit or scope of this invention.

The embodiments of the invention in which an exclusive property or privilege is claimed are defined as follows:

1. A compound of the formula,

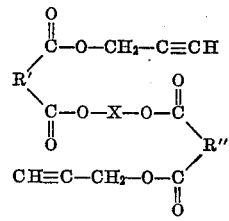

wherein X is a divalent radical selected from the group consisting of (a) alkylene of 1 to 20 carbon toms;
(b) xylylene;
(c) 2-butenylene; and R' and R" are each selected from the group consisting of phenylene, alkyl-substituted phenylene of 7 to 16 carbon atoms, halophenylene, nitrophenylene, cyclohexenylene, naphthylene, ethylene, trimethylene, alkyl-substituted ethylene of 7 to 14 carbon atoms, vinylene, chlorovinylene, bromovinylene, 1-isopropenylene and 3-isopropenylene.

2. A compound of the formula,

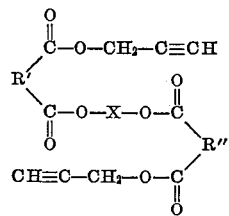

wherein X is a divalent radical selected from the group consisting of (a) alkylene of 1 to 20 carbon atoms;
(b) xylylene;
(c) 2-butenylene; and R' and R" are vinylene.

3. A compound of the formula,

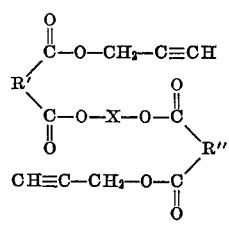

wherein X is a divalent radical selected from the group consisting of (a) alkylene of 1 to 20 carbon atoms;
(b) xylylene;
(c) 2-butenylene; and R' and R" are alkylene having 2 carbon atoms.

4. A compound of the formula,

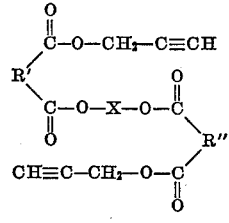

wherein X is a divalent radical selected from the group consisting of (a) alkylene of 1 to 20 carbon atoms;
(b) xylylene;
(c) 2-butenylene; and R' and R'' are phenylene.

5. 1,3-butanediol bis(2-propynyl phthalate).
6. 1,4-tetramethylene bis(2-propynyl succinate).
7. 1,4-tetramethylene bis(2-propynyl glutarate).

No references cited.

RICHARD K. JACKSON, *Primary Examiner.*
T. L. GALLOWAY, *Assistant Examiner.*